United States Patent Office 2,923,684

Patented Feb. 2, 1960

2,923,684

TIN MODIFIED FERROMAGNETIC CHROMIUM OXIDE, ITS PREPARATION AND USE IN RECORDING MEMBERS

John N. Ingraham, Wilmington, Del., assignor to E. I. du Pont de Nemours and Company, Wilmington, Del., a corporation of Delaware No Drawing. Application June 19, 1957
Serial No. 666,745

9 Claims. (Cl. 252—62.5)

This invention relates to ferromagnetic materials. More particularly, it relates to a new type of ferromagnetic chromium oxide and to a method for its preparation. The invention also relates to magnetic recording members having this new type of ferromagnetic chromium oxide as the magnetic component.

Ferromagnetic materials are employed in a variety of applications. For example, they are used in magnetic sound recording tapes, drums and records, memory devices, microwave circuitry, and as magnetic cores, such as coil cores in electronic equipment. In some of these applications, especially those requiring magnetic materials of low loss characteristics at high frequencies, or of relatively high coercivity, ferromagnetic oxides are normally more useful than ferromagnetic metals.

Heretofore, ferromagnetic iron oxides have been used extensively in the manufacture of magnetic recording tapes. Recently, some novel types of ferromagnetic chromium oxides have been developed which possess certain magnetic properties which make them of use in various applications. One such product, which is fully described and claimed in United States application Serial No. 617,283, filed October 22, 1956 by Alfred L. Oppegard, is a ruthenium-modified chromium oxide. It has a particular combination of magnetic properties, i.e., the combination of high intrinsic coercive force, $H_{ci}$, and high specific magnetization, $\sigma s$, that makes these particular chromium oxides especially useful as the magnetic component in magnetic recording tapes. While these ruthenium-modified chromium oxides are capable of producing superior magnetic recording tapes, the high cost of the ruthenium dioxide used in preparing them makes the process relatively expensive. It is, therefore, a desirable goal to develop new methods of making ferromagnetic chromium oxides having a desirable combination of magnetic properties by a more economical process. It is also desirable to provide ferromagnetic chromium oxides having a specific combination of magnetic properties which make individual products useful in specific applications.

It is an object of this invention to provide a new form of ferromagnetic chromium oxide and a method for its preparation. A further object is to provide a new form of ferromagnetic chromium oxide which is especially useful in the manufacture of magnetic recording tapes and in the manufacture of ceramic bodies such as magnetic cores. Another object is to provide a magnetic recording member having a magnetic track comprising this new form of ferromagnetic chromium oxide. Other objects will appear hereinafter.

These and other objects of this invention are accomplished by providing ferromagnetic chromium oxides containing 55.0–61.5% chromium and 0.4–5.0% tin, and having a tetragonal crystal structure. The tin-modified chromium oxides of this invention are produced in a form which consists essentially of acicular particles having lengths in the range of about 0.2–1.0 micron with an axial ratio, i.e., a ratio of length to width, within the range of about 5–15:1. They have an intrinsic coercive force greater than 140 oersteds, the preferred chromium oxides having an intrinsic coercive force ranging between 170 and 260 oersteds. The chromium oxides of this invention also possess specific magnetizations ranging from about 50 to about 85 electromagnetic units/gram (E.M.U./g.) with the preferred products having specific magnetizations ranging between 64 and 85 E.M.U./g. The products of this invention have a Curie temperature of about 123° C.

In view of the magnetic and physical properties of the tin-modified chromium oxides of this invention, they are especially useful as the magnetic material in magnetic recording members. Accordingly, the present invention includes magnetic recording members which comprise a carrier, such as a tape, drum, or record, of nonmagnetic material having bonded thereto a magnetic track of the ferromagnetic chromium oxides of this invention and a binder therefor.

The novel ferromagnetic chromium oxides of this invention are prepared by the novel process which comprises heating chromium trioxide, $CrO_3$, at a temperature within the range of 375–475° C. under a pressure of at least 200 atmospheres in the presence of water and from 0.75–7.5% or more, based on the weight of chromium trioxide, of a tin compound of the group consisting of stannous sulfate and stannic sulfide and separating and drying the resulting tin-modified ferromagnetic chromium oxide of high coercivity and specific magnetization.

The use of a small amount of an alkali metal sulfate, e.g., sodium, potassium, or lithium sulfate, or sulfuric acid or cadmium sulfate in conjunction with the tin compound in the process of this invention is beneficial in that such additives improve the magnetic properties of the products in comparison with the properties obtained by the use of stannous sulfate or stannic sulfide alone. The preparation of ferromagnetic chromium oxide from chromium trioxide in the presence of stannous sulfate orstannic sulfide, together with an alkali metal sulfate, sulfuric acid, or cadmium sulfate, is a preferred optional embodiment of the invention. Ferromagnetic chromium oxides having the best combination of magnetic properties for use in magnetic recording tapes are provided by this preferred embodiment.

The process of this invention can be carried out in a corrosion-resistant container, i.e., a container constructed of a material which is inert to the reactants under the reaction conditions. Satisfactory containers are made of platinum or of the alloy known commercially as "Hastelloy" C. The container can be a completely sealed tube having flexible walls or it can be any type of vessel permitting transmission of the desired pressure to the reaction system, such as a cylindrical tube closed at one end and equipped at the other end with a closely fitted piston, or it can be a pressure-resistant vessel having a corrosion-resistant lining.

The process is conveniently carried out in a container of the type that is placed inside a larger pressure vessel which is used to apply the pressure to the corrosion-resistant vessel containing the reactants. The container is charged with chromium trioxide, 0.75–7.5%, preferably 1.0–5.0% of stannous sulfate or stannic sulfide, based on the weight of chromium trioxide, and from 0.1–6.0 parts of water for each part of chromium trioxide. Preferably an amount of water ranging from 10–50% of the weight of the chromium trioxide is used. When the preferred embodiment of the process is being carried out, there is also added to the container up to 5%, preferably 1–5% of the weight of the chromium trioxide, of an alkali metal sulfate, sulfuric acid, or cadmium sulfate.

The corrosion-resistant container is closed and placed inside a larger vessel capable of withstanding high temperatures and pressures. The outer vessel is then closed and pressured with an inert liquid or gas, e.g., water or helium, so that at the operating temperature the pressure is at least 200 atmospheres. Good results are obtained with pressures ranging from 200–1000 atmospheres. Pressures of 3000 atmospheres and above can be used if the available equipment is strong enough to withstand them. The reaction vessel is then heated to a temperature between 375 and 475° C. and preferably between 400 and 450° C.

The reaction times are not critical. Periods ranging from a few minutes, e.g., five minutes, to three hours or more at the reaction temperature of 375–475° C. can be used. Reaction times of 1–3 hours give satisfactory results. Likewise, the time of heating the reaction vessel to the reaction temperature and the time of cooling it back after reaction is completed can vary considerably, depending on the size of the vessel and the charge and on the capacity of the heating and cooling equipment. However, it is preferred that heating to reaction temperature be completed in less than one hour and that cooling be completed in 24 hours.

After the reaction mixture has been heated to the desired operating temperature for the desired time, the entire reaction vessel is cooled with the pressure maintained until room temperature, about 25° C., is reached. The pressure is then released and, if a sealed corrosion-resistant vessel is employed, this may result in it being ruptured by the by-product oxygen present in the container. The resultant, slightly compacted or aggregated, black, acicular chromium oxide is separated from the dark-colored aqueous phase by filtration and is then washed and dried. A convenient way of doing this is to break up the lumps of crude reaction products in a mortar. This treatment merely breaks up the aggregates; it does not reduce the size or change the shape of the individual particles. The finely divided product is then washed by immersing it in distilled water and heating the water to boiling, followed by decantation or filtration. The washing in boiling distilled water is repeated two more times and then the product is collected on a filter, rinsed thoroughly with distilled water, and dried at about 150° C. for 60–65 hours in a vacuum of about 25–30 inches of mercury.

Tin is contained in the ferromagnetic chromium oxides of this invention, as evidenced by the inability to recover tin from the products by washing, magnetic separation or by other methods. Furthermore, since the crystal structure of tin oxide is similar to that of the chromium oxides of this invention, it is believed that the tin is present in positions in the crystal lattice normally occupied by chromium atoms. In any case, all the high coercive force chromium oxides of this invention contain small amounts, i.e., from 0.4–5.0% of tin.

Similarly, when the chromium oxides of this invention are made by the alternative embodiment in which an alkali metal sulfate or cadmium sulfate is included in the reaction mixture, the ferromagnetic chromium oxide obtained also contains a small amount, i.e., up to 1%, of the alkali metal or cadmium.

Chromium trioxide, stannous sulfate, stannic sulfide, alkali metal sulfate, sulfuric acid and cadmium sulfate of the grades commercially available are suitable for use in the process of this invention.

As indicated above, the ferromagnetic tin-modified chromium oxides of this invention possess a number of properties, or characteristics, which make them especially suitable for use in certain application. In addition to their being of very small particle size, i.e., having lengths between about 0.2 and 1.0 micron, the crystals are acicular in shape and are believed to be single crystals. On the basis of theoretical calculations, the particle size is about that expected for single domain particles. Single domain particles are especially useful in certain magnetic applications. Their acicular shape also makes them especially well suited for use in coating compositions applied on films, tapes, or other substrates. As a result of the acicular shape, the particles can be oriented in closer relationship during the mechanical spreading of the oxide composition in thin layers on a substrate. This in turn results in more uniform magnetic characteristics of the coated substrate.

The tetragonal crystal structure of the chromium oxides of this invention is of the rutile type, i.e., it has the same type of crystal structure as rutile, $TiO_2$. Ferromagnetic chromium oxides prepared by hitherto known methods have also exhibited the tetragonal crystal structure, but in all oxides other than those recently developed by applicant's assignee such as, for instance, the oxides of the aforementioned Oppegard application, other crystal structures have always been associated with the rutile-type structure, e.g., the corundum-type hexagonal crystal structure of $Cr_2O_3$. In contrast, the ferromagnetic chromium oxides of this invention have only a single crystal structure as shown by X-ray diffraction and this is the tetragonal crystal structure of the rutile type.

The ferromagnetic tin-modified chromium oxides of this invention exhibit several magnetic characteristics which make them especially valuable for use in various applications. These particular properties, which have been mentioned previously, and which are critical factors in their usefulness in certain magnetic applications, are the intrinsic coercive force, $H_{ci}$, and specific magnetization of sigma, $\sigma s$. The definition of the intrinsic coercive force, $H_{ci}$, is given in Special Technical Publication No. 85 of the American Society for Testing Materials, entitled "Symposium on Magnetic Testing" (1948), pp. 191–198. The values for the intrinsic coercive force given herein are determined on a D.C. ballistic-type apparatus which is a modified form of the apparatus described by Davis and Hartenheim in the Review of Scientific Instruments 7, 147 (1936). The sigma value, $\sigma s$, is defined on pages 7 and 8 of Bozorth's "Ferromagnetism," D. Van Nostrand Co., New York, 1951. This sigma value is equal to the intensity of magnetization, $I_s$, divided by the density, $d$, of the material. The sigma values given herein are determined on apparatus similar to that described by T. R. Bardell on pp. 226–228 of "Magnetic Materials in the Electric Industry," Philosophical Library, New York, 1955.

The tin-modified ferromagnetic chromium oxides of this invention having intrinsic coercive forces, $H_{ci}$, of more than 140, and especially those having values of 170–260 oersteds, and having sigma values, $\sigma s$, of 50–85, and especially 64–85 E.M.U./g., are particularly suitable for use as the magnetic component in magnetic recording tapes.

The invention is illustrated further by the following examples in which the proportions of ingredients are expressed in parts by weight unless otherwise noted.

EXAMPLE I

A flexible platinum tube is charged with 5.0 parts of chromium trioxide, 0.05 part of stannous sulfate, and 0.85 part of water. The tube is sealed and then placed in a water-filled pressure vessel and heated to 400° C. under a pressure of 730–750 atmospheres for three hours. The pressure is maintained as the reaction vessel is cooled to room temperature and, after depressuring, the platinum tube is removed and carefully opened. The product is removed, any lumps broken up in an agate mortar and then washed by placing in distilled water and heating the water to boiling. This washing is repeated two more times and the washed product is collected on a filter, rinsed thoroughly with distilled water, and dried in a vacuum oven at 150° C. under a vacuum of 25–30 inches of mercury for 65 hours. The product, a tin-modified ferromagnetic chromium oxide, is a strongly magnetic, black powder having an intrinsic coercive force, $H_{ci}$, of 142 oersteds and a saturation magnetization, σs, of 82.3 E.M.U./g.

EXAMPLE II

A mixture of 3.0 parts of chromium trioxide, 0.06 part of stannous sulfate, 0.05 part of potassium sulfate, and 0.46 part of water is heated in a sealed platinum tube as described in the preceding example. A temperature of 398–400° C. at a pressure of 750–780 atmospheres is maintained for 3 hours. The product, isolated as described in Example I, is a black, strongly magnetic solid having an intrinsic coercive force of 198 oersteds and a saturation magnetization of 64.0 E.M.U./g.

When the process of Example II is repeated with the exception that identical quantities of lithium sulfate and sodium sulfate are substituted for the potassium sulfate, ferromagnetic products having coercive forces of 170 and 158 oresteds, respectively, and sigma values of 63.8 and 65.5 E.M.U./g., respectively, are obtained.

EXAMPLE III

A flexible platinum tube is charged with 30.0 parts of chromium trioxide, 0.6 part of stannous sulfate, 1.1 parts of potassium sulfate and 4.0 parts of water. The sealed tube is heated for three hours at a temperature of 423–425° C. under a pressure of 250–270 atmospheres. The product is isolated as in the preceding examples, and there is obtained a black, strongly magnetic solid having an intrinsic coercive force of 254 oersteds and a sigma value, σs, of 66.5 E.M.U./g.

*Analysis*.—Cr, 58.76, 58.85%; Sn (as $SnO_2$), 1.15%; K, 0.37%; $H_2O$ 1.81, 1.21, 1.30%.

The product shows only the X-ray diffraction pattern characteristic of chromium dioxide.

EXAMPLE IV

The tin-modified ferromagnetic chromium oxide of Example III is employed in the preparation of a magnetic recording tape as follows: Ten parts of this ferromagnetic chromium oxide is dispersed in 35 parts of a 1:1 toluene/tertiary butyl alcohol mixture containing 0.3 part of cetyldimethylamine by milling for two days in an 8-ounce glass jar containing 160 parts of one-quarter inch glass beads. To the resulting dispersion there is added 16.6 parts of a 20% solution of polyvinyl butyral in 1:1 toluene/tertiary butyl alcohol mixture containing 0.5 part of dibutyl sebacate. Milling is continued for an additional two days. The dispersion is filtered and coated onto a 1-mil polyethylene terephthalate film by means of a doctor knife set at 5 mils clearance. The coated film is dried, leaving a coating 0.5 mil in thickness.

The tape prepared as described above is tested for performance in a magnetic tape recorder ("Ampex No. 307") at a tape speed of 30 inches per second with optimum bias current. The tape is subjected to a constant sound input at several frequencies between 1 and 20 kilocycles. The unequalized output signals at these different frequencies are then measured, and the results are tabulated below.

*Output at various frequencies*

| Frequency (kc.) | Output (db) |
|---|---|
| 1 | −17.7 |
| 2 | −12.8 |
| 4 | −9.6 |
| 8 | −9.5 |
| 10 | −10.3 |
| 15 | −12.6 |
| 20 | −15.4 |
| Input (constant at all frequencies) | 6.8 |

EXAMPLE V

A flexible platinum tube is charged with 3.0 parts of chromium trioxide, 0.06 part of stannous sulfate, and 0.58 part of 20% sulfuric acid. The tube is sealed and then heated at a temperature of 395–403° C. under a pressure of 750–785 atmospheres for three hours. After cooling the reaction vessel and isolating the product as in the previous examples, there is obtained a black, strongly magnetic solid having an intrinsic coercive force of 225 oersteds and a sigma value, σs, of 64.1 E.M.U./g. This ferromagnetic chromium oxide contains 58.7% Cr and 1.05% Sn (on a bone-dry basis).

EXAMPLE VI

A flexible platinum tube is charged with 30.0 parts of chromium trioxide, 1.50 parts of stannous sulfate, 1.1 parts of potassium sulfate, and 4.0 parts of water, and the sealed tube is heated at 445–459° C. under 990 atmospheres for three hours. After cooling the reaction vessel and isolating the product as in the preceding examples, there is obtained a black, magnetic solid having an intrinsic coercive force of 242 oersteds and a sigma value, σs, of 72.1 E.M.U./g. This ferromagnetic chromium oxide contains 57.0% chromium, 3.36% tin and 0.14% potassium (on a bone-dry basis). The product shows the rutile-type X-ray pattern characteristic of chromium dioxide.

EXAMPLE VII

A mixture of 3.0 parts of chromium trioxide, 0.03 part of stannous sulfate, 0.11 part of cadmium sulfate hydrate ($3CdSO_4.8H_2O$), and 0.40 part of water is heated as described in the preceding examples in a sealed platinum tube at 396–402° C. under a pressure of 720–780 atmospheres for three hours. The black ferromagnetic chromium oxide obtained has a coercive force of 170 oersteds and a sigma value, σs, of 73.8 E.M.U./g. Analysis shows 60.4% chromium, and 0.049% cadmium (on a bone-dry basis). X-ray fluorescence measurements indicate the presence of 0.5–0.7% tin (calculated as $SnO_2$). The X-ray diffraction pattern agrees with that of chromium dioxide.

EXAMPLE VIII

A mixture of 3.0 parts of chromium trioxide, 0.03 part of stannic sulfide, and 0.51 part of water is heated in a sealed platinum tube as in the preceding examples at 400° C. under a pressure of 600–745 atmospheres for three hours. The product isolated as in the preceding examples is a ferromagnetic solid having an intrinsic coercive force of 186 oersteds and a sigma value, σs, of 72.5 E.M.U./g. This ferromagnetic chromium oxide contains 60.2% chromium and 0.80% tin (on a bone-dry basis). The X-ray diffraction pattern is that of chromium dioxide.

An important advantage of the process of this invention over the best of the hitherto known methods of making ferromagnetic chromium oxides of high coercivity and specific magnetization resides in its being a lower cost process. Stannous sulfate and stannic sulfide are considerably less expensive than ruthenium dioxide. Another advantage is that the high water solubility of stannous sulfate permits a more uniform mixing of this sulfate throughout the reaction mixture.

While the ferromagnetic tin-modified chromium oxides of this invention are especially valuable for use in magnetic recording tapes, drums, and records, they are also useful in other applications, especially in the manufacture of ceramic bodies, such as magnetic cores, when they are compacted into shaped objects having about the theoretical density. In the compacted form, they are useful in magnetic memory cores for computers, in gyrator elements, in electrically operated high-frequency switches, and in low-loss transformer cores for magacycle/second frequency ranges. The tin-modified chromium oxides of this invention are also useful as focusing magnets and in microwave attenuators.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A ferromagnetic chromium oxide containing, by weight, 55.0% to 61.5% chromium and 0.4 to 5.0% tin, said chromium and tin being combined with oxygen, and said oxide having a tetragonal crystal structure of the rutile type.

2. A ferromagnetic chromium oxide containing, by weight, 55.0% to 61.5% chromium and 0.4 to 5.0% tin, said chromium and tin being combined with oxygen, said oxide having an intrinsic coercive force above 140 oersteds and consisting essentially of acicular particles of tetragonal crystal structure having lengths in the range of about 0.2 to 1.0 micron, and having an axial ratio of from 5:1 to 15:1.

3. A ferromagnetic chromium oxide as set forth in claim 2 in which said chromium oxide has an intrinsic coercive force of between 170 and 250 oersteds.

4. A magnetic recording member which comprises a carrier of non-magnetic material having bonded thereto a ferromagnetic chromium oxide as set forth in claim 2, and a binder therefor.

5. A magnetic recording member which comprises a carrier of non-magnetic material having bonded thereto a ferromagnetic chromium oxide as set forth in claim 3 and a binder therefor.

6. A ferromagnetic chromium oxide as set forth in claim 2 in which said chromium oxide has a specific magnetization within the range of 50 to 85 electromagnetic units/gram.

7. Process for preparing a ferromagnetic chromium oxide of high coercive force which comprises heating at a temperature within the range of 375° to 475° C. and under a pressure of at least 200 atmospheres chromium trioxide in the presence of water and from 0.75% to 7.5% by weight based on said chromium trioxide of a tin compound selected from the group consisting of stannous sulfate and stannic sulfide, and separating and drying as the resulting product a ferromagnetic chromium oxide of high coercivity and specific magnetization.

8. Process for preparing a ferromagnetic chromium oxide of high coercive force which comprises heating at a temperautre within the range of 375° to 475° C. and under a pressure of 200 to 3000 atmospheres, chromium trioxide, from 0.1 to 6.0 parts of water per part of chromium trioxide, and from 0.75 to 7.5% by weight based on said chromium trioxide of a tin compound selected from the group consisting of stannous sulfate and stannic sulfide, and separating and drying as the resulting product a ferromagnetic chromium oxide of high coercivity and specific magnetization.

9. Process as set forth in claim 7 in which up to 5%, based on the weight of chromium trioxide, of a compound selected from the group consisting of an alkali metal sulfate, sulfuric acid and cadmium sulfate is present in the reaction system, and from 0.1 to 6.0 parts of water being present per part of chromium trioxide.

References Cited in the file of this patent

UNITED STATES PATENTS

| | | |
|---|---|---|
| 510,318 | Bertrand | Dec. 5, 1893 |
| 1,847,860 | Best | Mar. 1, 1932 |
| 2,579,267 | Leverenz et al. | Dec. 18, 1951 |

FOREIGN PATENTS

| | | |
|---|---|---|
| 79,302 | Netherlands | Oct. 15, 1955 |

OTHER REFERENCES

Verway et al.: J. of Chemical Physics, vol. 15, pp. 174–180, April 1947.

Kordes et al.: Chemical Abstracts, vol. 46, col. 4411, May 25, 1952.